US009590888B2

(12) United States Patent
Yuan

(10) Patent No.: US 9,590,888 B2
(45) Date of Patent: Mar. 7, 2017

(54) LINK KEEPALIVE METHOD, CONTROLLER AND SWITCH

(71) Applicant: ZTE CORPORATION, Shenzhen, Guangdong Province (CN)

(72) Inventor: Renjie Yuan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/646,495

(22) PCT Filed: Sep. 26, 2013

(86) PCT No.: PCT/CN2013/084255
§ 371 (c)(1),
(2) Date: May 21, 2015

(87) PCT Pub. No.: WO2014/079271
PCT Pub. Date: May 30, 2014

(65) Prior Publication Data
US 2015/0304205 A1    Oct. 22, 2015

(30) Foreign Application Priority Data
Nov. 22, 2012  (CN) .......................... 2012 1 0478407

(51) Int. Cl.
*H04L 12/751* (2013.01)
(52) U.S. Cl.
CPC ................... *H04L 45/026* (2013.01)
(58) Field of Classification Search
CPC .............................. H04W 24/00; H04L 43/50
See application file for complete search history.

(56) References Cited

U.S. PATENT DOCUMENTS

| 2012/0044935 | A1 | 2/2012 | Hama et al. | |
|---|---|---|---|---|
| 2013/0010600 | A1* | 1/2013 | Jocha | H04L 43/026 370/236.2 |
| 2013/0223277 | A1* | 8/2013 | DeCusatis | H04L 67/1097 370/254 |

FOREIGN PATENT DOCUMENTS

| CN | 102546351 A | 7/2012 |
|---|---|---|
| CN | 102687464 A | 9/2012 |
| CN | 103001887 A | 3/2013 |

OTHER PUBLICATIONS

Updated on Split Architecture for Large Scale Wide Area Networks; Wolfgang John, et al. ;SPARC, ICT-258457. 31 Dec. 2011; XP055070646.

(Continued)

*Primary Examiner* — Andrew Lai
*Assistant Examiner* — Zhiren Qin
(74) *Attorney, Agent, or Firm* — Ling Wu; Stephen Yang; Ling and Yang Intellectual Property

(57) ABSTRACT

The present document discloses a link keep-live method, a controller and a switch, including: acquiring link information by the controller, after the link information is acquired, sending the link information to a source switch and/or destination switch of a link corresponding to the link information; and, correspondingly sending keep-live mode information and a link keep-live starting instruction to the source switch and/or destination switch, triggering the source switch and/or destination switch to perform the link keep-live between the source switch and destination switch according to the link information and keep-live mode information; or, after the controller acquires the link information, sending the link information to the source switch and/or destination switch of the link corresponding to the link information, triggering the source switch and/or destination switch to determine a mode adopted for link keep-live, (Continued)

performing the link keep-live between the source switch and destination switch according to the determined mode.

11 Claims, 4 Drawing Sheets

(56) References Cited

OTHER PUBLICATIONS

Openflow 1. X. Discussion; OpenFlow Wiki, Mar. 18, 2011; XP055224960.

* cited by examiner

LINK KEEPALIVE METHOD, CONTROLLER AND SWITCH

TECHNICAL FIELD

The present document relates to the field of communication, in particular to a link keep-live method, a controller and a switch.

BACKGROUND OF THE RELATED ART

The present network exposes more and more defects, and requirements of people on network performance are improved continuously. Therefore, researchers have to add multiple complicated functions to the structural system of a router, such as OSPF (Open Shortest Path First Interior Gateway Protocol), BGP (Border Gateway Protocol), multicast, differentiated service, traffic engineering, NAT (Network Address Translation), firewall, MPLS (Multi-Protocol Label Switching) and the like, which causes that exchange equipment such as the router is bloated more and more and the performance enhancing space is smaller and smaller. In 2008, Stanford University in America puts forward a concept of openflow network, and one basic openflow network comprises two control entities: a network controller at a control side and a switch at a forwarding side. The controller controls multiple switches by a standardized openflow protocol, and sends a flow table to the switch. The switch executes forwarding according to the flow table, and if no flow table item is matched, data message header information is packaged in a packet in message and is then sent to the controller for processing, and the controller sends a flow table item to guide forwarding according to an existing topological information computation path.

At present, under a software definition network environment, the controller is periodic, the link layer discovery mechanism is that the controller periodically (about 0.1 second) sends a link discovery message (same as link detection message and packaged in Packet-Out) for each active port of the switch, and the link discovery messages are sent are sent out from corresponding ports of the switch, such as a link layer discovery protocol (LLDP) message. The switch at the other end of the source switch queries the flow table after receiving the link discovery message, aiming at the link discovery message, the controller does not send the corresponding flow table in advance, and after the switch may not query a flow table matching rule, the switch uploads the message (Packet-In) to the controller. After receiving the message, the controller analyzes the message, the link detection message usually contains the identity and port number of the switch sending the message (source switch), and it contains the information such as identity, outlet port number and TTL of the switch if the message is a LLDP message. The controller may acquire one link according to the identity and port number of the switch (destination switch) uploading the message so as to construct a network topology.

After receiving each link detection message, the controller needs to analyze the message to acquire link information, and updates the timestamp of the corresponding link; if no link state is updated in a specified time interval, link failure is considered, and corresponding information is deleted, and the topology is updated. As the link is dynamically changed, the switch needs to upload each received link detection message to the controller so as to keep the timeliness of the network topology. A common link detection message is sent at the active port of each switch at a period such as 0.1 s, so the number of messages is very high. The link detection messages repetitively sent to the controller occupy more network bandwidth and consume more computing resources of the controller.

SUMMARY OF THE INVENTION

The present document aims to solve the technical problem by providing a link keep-live method, a controller and a switch, through which in an openflow network, the interaction of massive link detection messages between the switch and the controller is avoided.

In order to solve the technical problems, the link keep-live method provided by the present document comprises:

acquiring link information by the controller, and after the link information is acquired, sending the link information to a source switch and/or a destination switch of a link corresponding to the link information; and, correspondingly sending keep-live mode information and a link keep-live starting instruction to the source switch and/or the destination switch, triggering the source switch and/or the destination switch to perform link keep-live between the source switch and the destination switch according to the link information and the keep-live mode information; or, after the controller acquires link information, sending the link information to a source switch and/or a destination switch of a link corresponding to the link information, triggering the source switch and/or the destination switch to determine a mode adopted for link keep-live, and performing link keep-live between the source switch and the destination switch according to the determined mode.

Preferably, the keep-live mode information comprises information of a protocol used for link keep-live, for indicating, to a switch, a protocol used to perform link keep-live.

Preferably, the method also comprises:

when the controller sends the keep-live mode information to the source switch and/or the destination switch, also sending related configuration information of the protocol used for link keep-live and/or a used protocol data message to the source switch and/or the destination switch.

Preferably, the mode adopted for link keep-live comprises the protocol used for link keep-live and related configuration information of the protocol.

Preferably, the method also comprises:

after the keep-live mode information is sent to the source switch and/or the destination switch by the controller, not sending a link discovery message to the source switch, receiving link abnormal information sent by the switch, and after the link abnormal information is received, starting to send a link discovery message for the link to perform link discovery.

A link keep-live method comprises:

receiving link information and keep-live mode information sent from the controller by the switch; and, after a link keep-live starting instruction sent from the controller is received, performing link keep-live with opposite-end switches indicated by the link information according to the link information and the keep-live mode information; or receiving link information sent from the controller by the switch, after the link information is received, determining a mode adopted for link keep-live and performing link keep-live with opposite-end switches indicated by the link information according to the determined mode.

Preferably, the method also comprises:

in a process of link keep-live, under the condition that the link is normal, the switch not receiving a link discovery message sent by the controller any more; under the condition that the link is abnormal, sending link abnormal information to the controller.

Preferably, the keep-live mode information comprises information of a protocol used for link keep-live, for indicating a protocol used to perform link keep-live;

performing the link keep-live with the opposite-end switches indicated by the link information according to the link information and the keep-live mode information, comprises: performing link keep-live with the opposite-end switches indicated by the link information through the switch by adopting the protocol indicated by the keep-live mode information.

Preferably, determining a mode used to perform link keep-live, comprises:

the switch negotiating a protocol used for link keep-live and related configuration information of the protocol with the opposite-end switches indicated by the link information.

A controller comprises a link information acquiring unit and a link keep-live control unit, wherein:

the link information acquiring unit is set to: receive link information;

the link keep-live control unit is set to: send the link information to a source switch and/or a destination switch of a link corresponding to the link information after the link information acquiring unit acquires the link information; and, correspondingly send keep-live mode information and a link keep-live starting instruction to the source switch and/or the destination switch, and trigger the source switch and/or the destination switch to perform link keep-live between the source switch and the destination switch according to the link information and the keep-live mode information; or, send the link information to the source switch and/or the destination switch of the link corresponding to the link information, trigger the source switch and/or the destination switch to determine a mode adopted for link keep-live, and perform link keep-live between the source switch and the destination switch according to the determined mode.

Preferably, the keep-live mode information comprises information of a protocol used for link keep-live, for indicating, to a switch, a protocol used to perform link keep-live.

Preferably, the link keep-live control unit is also set to: not send a link discovery message to the source switch after the keep-live mode information is sent to the source switch and/or the destination switch, receive link abnormal information sent by the switch, and start sending a link discovery message for the link to perform link discovery after the link abnormal information is received.

A switch comprises a receiving unit and a link keep-live unit, wherein:

the receiving unit is set to: receive the link information sent from the controller; or receive the link information, the keep-live mode information and a link keep-live starting instruction sent from the controller;

the link keep-live unit is set to: perform link keep-live with the opposite-end switches indicated by the link information according to the link information and the keep-live mode information after the receiving unit receives the link keep-live starting instruction sent from the controller; or determine a mode adopted to perform link keep-live and perform link keep-live with the opposite-end switches indicated by the link information according to the determined mode after the receiving unit receives the link information.

Preferably, the link keep-live unit is also set to: not receive the link discovery message sent by the controller any more in a process of link keep-live and under the condition that the link is normal; send link abnormal information to the controller under the condition that the link is abnormal.

Preferably, the keep-live mode information comprises information of a protocol used for link keep-live, for indicating a protocol used to perform link keep-live.

The link keep-live unit is set to perform link keep-live with the opposite-end switches indicated by the link information by adopting a protocol indicated by the keep-live mode information.

In conclusion, according to the embodiments of the invention under an openflow network model, the controller sends a link detection message to perform link detection, and the link keep-live information is sent to the switch after acquiring the link information, and a link keep-live method is negotiated with the switch, and the switch realizes link keep-live by itself according to the negotiation between the controller and the switch; the controller may also notify the switch of the acquired link information, and the mode for link keep-live may be negotiated and decided by the switches itself on the link; the controller is notified when the link state is changed, the massive link detection messages between the switch and the controller are avoided, the occupation of network bandwidth is saved and the consumption of computing resource of the controller is saved.

PREFERRED EMBODIMENTS OF THE PRESENT INVENTION

In present embodiment, when a switch receives the link detection (link discovery) message sent from a certain port for the first time, and when a controller does not send a flow table for the link detection message, the switch sends the link detection message to the controller after not matching a corresponding flow table; the controller may send a corresponding flow table for the link detection message to improve the matching efficiency, in this case, after matching a flow table item, the switch sends the link detection message to the controller, and the controller acquires the link information. After acquiring the link information, the controller processes the same with any following modes: (1) sending the detected link information to a source switch and/or a destination switch of the link, and sending the keep-live mode information and related configuration information to the source switch and/or the destination switch of the link by the controller so as to support the link detection protocol and realize the link keep-live, and enabling the source switch and destination switch of the link to correspondingly dynamically send and/or receive the link detection message; (2) sending the detected link information to the source switch and/or the destination switch of the link, wherein the switches on the link exchange message by themselves to negotiate or determine the mode adopted for performing link keep-live by themselves according to preset configuration. Meanwhile, the controller does not send the link detection message related to the link any more.

In present embodiment, the link state is dynamically detected among the switches to realize link keep-live, and if the link state is not changed, the switch and the controller does not need to perform information interaction related to the state of the corresponding link, and certainly, no link discovery message of the corresponding link is uploaded to the controller; if the link changes, for example the link fails, the link failure information is uploaded to the controller, and the controller maintains the state of the link, and then sends the link detection (discovery) message to perform link detection (discovery).

The embodiments of the invention are described in detail in combination with drawings. It needs to be explained that under the non-conflict condition, the embodiments of the invention and features in the embodiments may be randomly combined.

Figure 1:
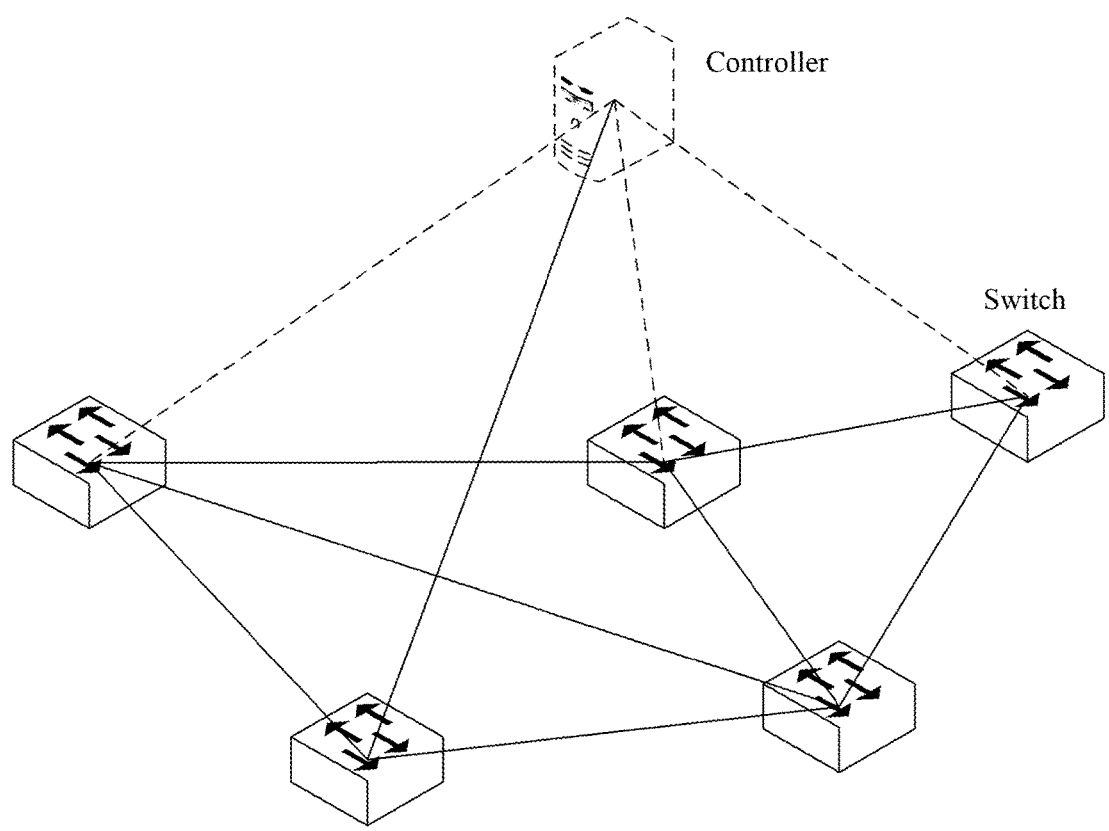
FIG. 1 is a current network topological graph of openflow.

As shown in FIG. 1, in an openflow network, the controller controls and manages multiple switches, and when the controller acquires one piece of link information, the controller sends keep-live mode information and related configuration information to the switch in the corresponding link and notifies the switch of starting the link keep-live. Link keep-live is performed among the switches by themselves, under the condition that the link state is not changed, the controller does not need to send the link discovery message Packet-out to the switches, so that there is no need for the switch to upload the corresponding message. When the link state changes, the switch notifies the controller of the corresponding link state and the controller performs link detection again.

Embodiment 1

Figure 2:
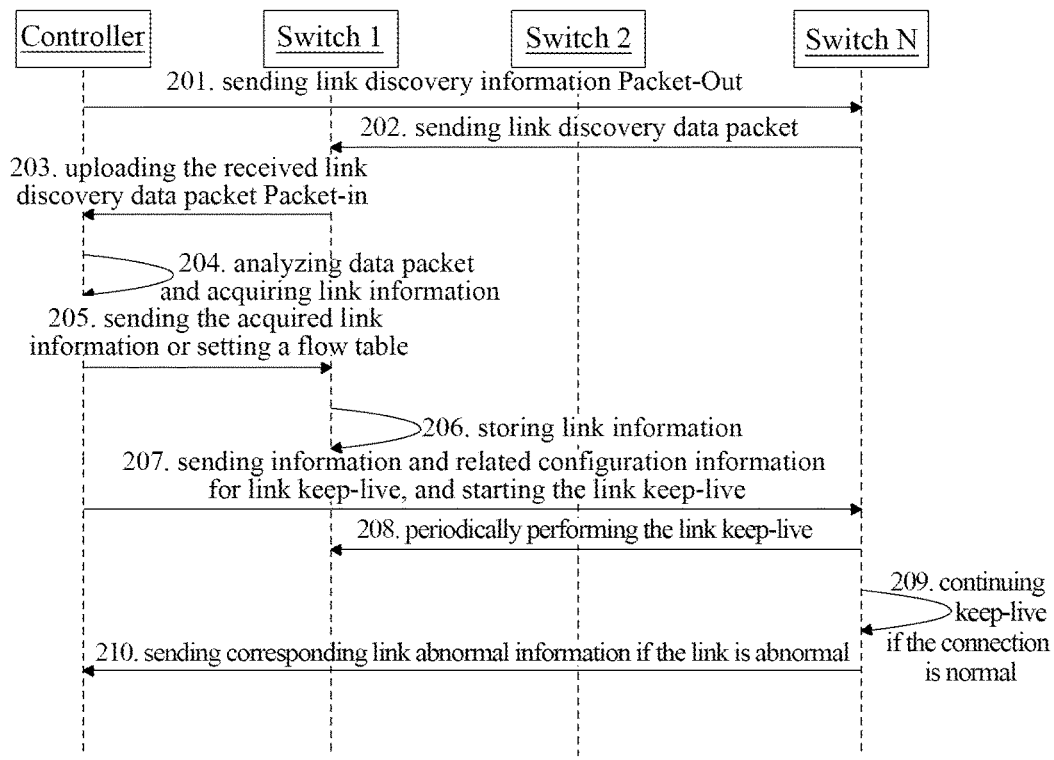
FIG. 2 is a flow diagram of a link keep-live method of an embodiment 1 of the invention.

In present embodiment, in link keep-live processing process which is performed by the controller and the switch, the controller sends the keep-live mode information and related configuration information at one step and notifies the switch of starting the link keep-live; as shown in FIG. 2, the switch establishes a connection with the controller after being powered on, and the controller acquires the active port of the switch after the connection has been established, and the method in present embodiment comprises:

step 201: sending the link discovery message to the switch by the controller, wherein the link discovery message is carried in a Packet-Out data packet, and the message comprises the information of the port of switch for link discovery;

step 202: after the switch receives the link discovery message, sending the link discovery message from a port designated by the controller;

step 203: after the switch connected at the other end receives the message and matches a flow table, uploading the message to the controller (carried in the Packet-In);

step 204: receiving the Packet-In by the controller, wherein the message carries the identity and corresponding port number of the switch uploading the Packet-In; acquiring the identity and port number of the source switch sending the link discovery message from the message and acquiring link information of one link;

step 205: sending the acquired link information to the switch in the corresponding link by the controller;

step 206: storing the link information sent by the controller through the switch so as to facilitate the link keep-live;

step 207: sending the keep-live mode information and related configuration information for link keep-live by the controller, wherein the keep-live mode information contains the information of a protocol used for link keep-live, and the protocol data message may be sent and may also be packed by the switch by itself; sending a link keep-live starting instruction to start link keep-live;

the link keep-live may adopt any currently used link keep-live protocols, which comprise but are not limited to link layer discovery protocol (LLDP), operation, administration and maintenance protocol data unit (OAMPDU) and bidirectional forwarding detection (BFD). For LLDP, related configuration information comprises time intervals of sending a protocol message and time to live (TTL) of the protocol message; for OAM protocol, related configuration information comprises the type of message, detection periods of error frame period events, a number threshold value of error signals, a number threshold value of error frames and the like; for BFD protocol, related configuration information comprises a detection mode, a certification type, a sending period, detection time and the like. Related configuration information may also be directly configured in the switch and may be sent to the switch without the controller.

step 208: the switches performing link keep-live by themselves according to the keep-live mode information and related configuration information sent by the controller, wherein the controller does not need to interfere with the link keep-live process;

step 209: if the link is normal, continuously keeping live;

step 210: if the link is abnormal, sending corresponding link abnormal information to the controller and performing link discovery or subsequent work again by the controller.

Embodiment 2

Figure 3:
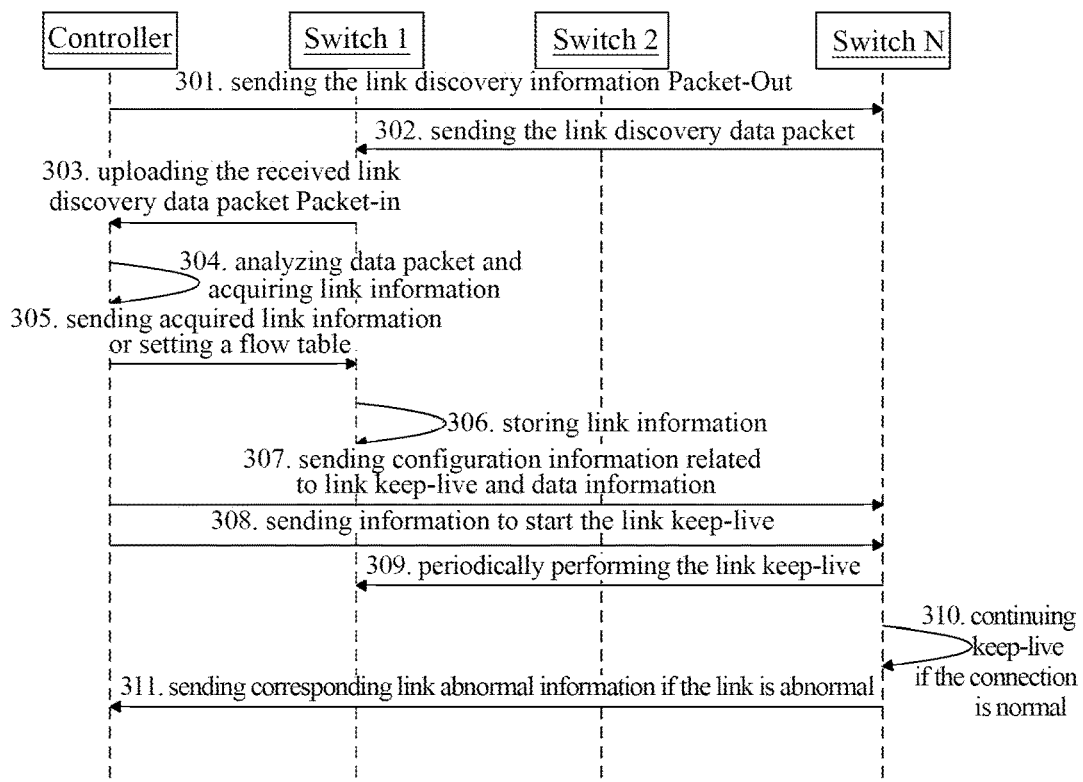
FIG. 3 is a flow diagram of a link keep-live method of an embodiment 2 of the invention.

In the link keep-live processing process which is performed by the controller and the switch in the embodiment, the controller sends the keep-live mode information and related configuration information to the switch, and then sends a link keep-live starting instruction to the switch for link keep-live; in FIG. 3, after being powered on, the switch establishes a connection with the controller, and the controller acquires the active port of the switch after the connection has been established:

step 301: sending a link discovery message to the switch by the controller, wherein the message is carried in a Packet-Out data packet and the message contains the information of the port of switch performing link discovery;

step 302: after the switch receives the link discovery message, sending the link discovery message from a port designated by the controller;

step 303: after the switch connected at the other end receives the message and matches a flow table, uploading the message to the controller (carried in the Packet-In);

step 304: receiving the Packet-In by the controller, wherein the message carries the identity and corresponding port number of the switch uploading the Packet-In; acquiring the identity and port number of the source switch sending the link discovery message from the message and acquiring link information of one link;

step 305: sending the acquired link information to the switch in the corresponding link by the controller;

step 306: storing the link information sent from the controller by the switch so as to facilitate the link keep-live;

step 307: sending the keep-live mode information and related configuration information for link keep-live by the controller, wherein the keep-live mode information contains the information of a protocol used for link keep-live, and the protocol data message may be sent and may also be packaged by the switch by itself, and the protocol message information may also be sent in the next step;

step 308: when the controller does not send the protocol data message in step 307, sending the protocol data message and sending a link keep-live starting instruction to start the link keep-live;

step 309: the switches performing the link keep-live by themselves according to the keep-live mode information sent by the controller, wherein the controller does not need to interfere with the link keep-live process;

step 310: if the link is normal, continuously performing keep-live;

step 311: if the link is abnormal, sending corresponding link abnormal information to the controller and performing link discovery or subsequent work again by the controller.

Embodiment 3

Figure 4:
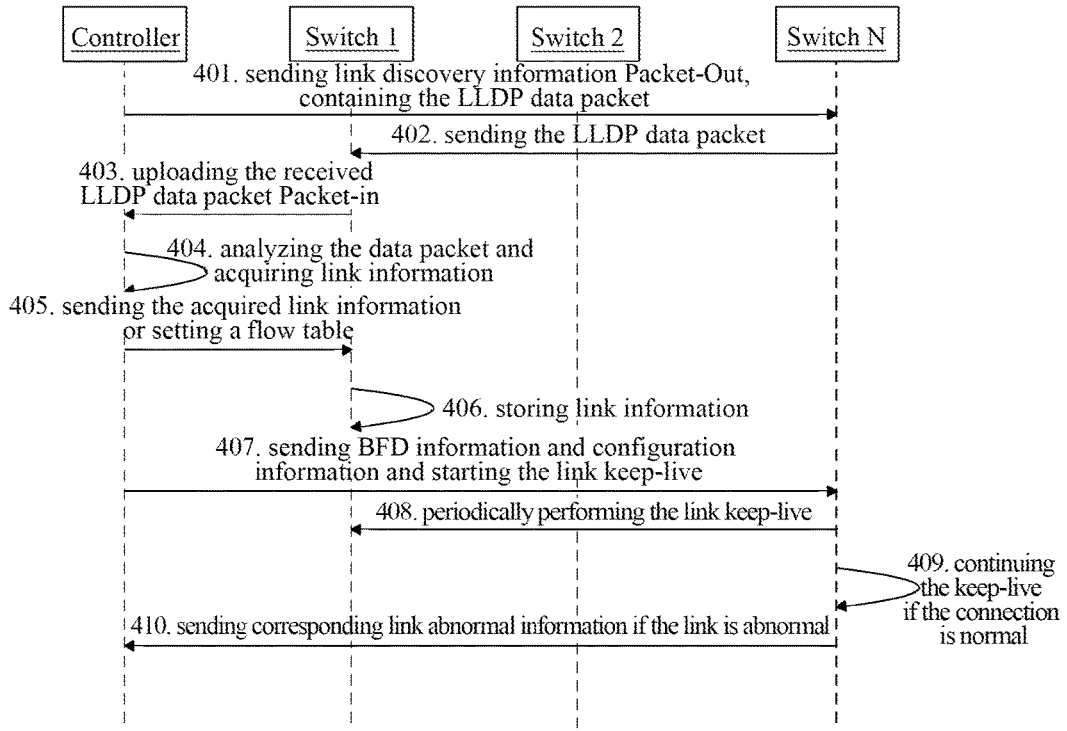
FIG. 4 is a flow diagram of a link keep-live method of an embodiment 3 of the invention.

The controller and the switch use a specific protocol to perform link discovery and keep-live processing process, it is description of one specific implementation mode of embodiment 1, and the LLDP protocol is adopted to perform link discovery, and the BFD protocol is adopted for link keep-live; in FIG. 4, after being powered on, the switch establishes a connection with the controller, and the controller acquires the active port of the switch after the connection has been established:

step 401: sending the LLDP link discovery message to the switch by the controller, wherein the message is carried in the Packet-Out data packet and the message contains information of the port of the switch performing link discovery;

step 402: after the switch receives the LLDP link discovery message, sending the LLDP link discovery message from a port designated by the controller;

step 403: after the switch connected at the other end receives the LLDP link discovery message and matches a flow table, uploading the message to the controller (carried in the Packet-In);

step 404: receiving the Packet-In by the controller, wherein the message carries the identity and corresponding port number of the switch uploading the Packet-In; acquiring the identity and port number of the source switch sending the LLDP link discovery message from the LLDP link discovery message and acquiring link information of one link;

step 405: sending the acquired link information to the switch in the corresponding link by the controller;

step 406: storing the link information sent from the controller by the switch so as to facilitate the link keep-live;

step 407: sending the keep-live mode information and related configuration information for link keep-live by the controller, and notifying the switch of performing link keep-live by using the BFD protocol, wherein the BFD protocol data message may be sent and may also be packaged by the switch by itself; and starting the link keep-live;

step 408: the switches performing link keep-live by using the BFD protocol, wherein the controller does not need to interfere with the link keep-live process;

step 409: if the link is normal, continuously performing keep-live;

step 410: if the link is abnormal, sending corresponding link abnormal information to the controller and performing link discovery or subsequent work again by the controller.

Embodiment 4

Figure 5:
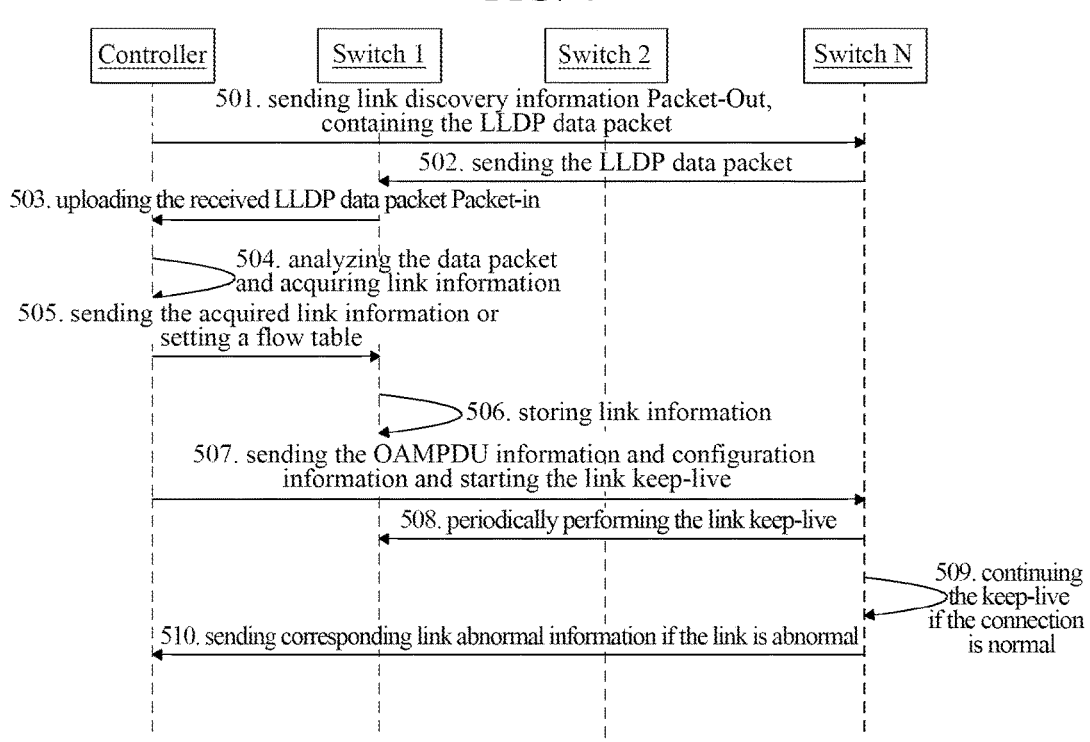
FIG. 5 is a flow diagram of a link keep-live method of an embodiment 4 of the invention.

The controller and the switch use a specific protocol to perform link discovery and keep-live processing process, it is description of another specific implementation mode of embodiment 1, and the LLDP protocol is used for link discovery, and the OAX protocol is used for link keep-live; in FIG. 5, after being powered on, the switch establishes a connection with the controller, and the controller acquires the active port of the switch after the connection has been established:

step 501: sending the LLDP link discovery message to the switch by the controller, wherein the LLDP link discovery message is carried in the Packet-Out data packet and the message contains information of the port of the switch performing link discovery;

step 502: after the switch receives the LLDP link discovery message, sending the LLDP link discovery message from a port designated by the controller;

step 503: after the switch connected at the other end receives the LLDP link discovery message and matches a flow table, uploading the message to the controller (carried in the Packet-In);

step 504: receiving the Packet-In by the controller, wherein the message carries the identity and corresponding port number of the switch uploading the Packet-In; acquiring the identity and port number of the source switch sending the LLDP link discovery message from the LLDP link discovery message and acquiring link information of one link;

step 505: sending the acquired link information to the switch in the corresponding link by the controller;

step 506: storing the link information sent from the controller by the switch so as to facilitate the link keep-live;

step 507: sending the keep-live mode information and related configuration information for link keep-live by the controller, and notifying the switch of performing link keep-live by using the OAM protocol, wherein the OAM protocol data message may be sent and may also be packaged by the switch by itself; and starting the link keep-live;

step 508: the switches performing link keep-live by themselves by using the OAM protocol, wherein the switches interact by sending OAMPDU information and the controller does not need to interfere with the link keep-live process;

step 509: if the link is normal, continuously performing keep-live;

step 510: if the link is abnormal, sending corresponding link abnormal information to the controller and performing link discovery or subsequent work again by the controller.

Embodiment 5

Figure 6:
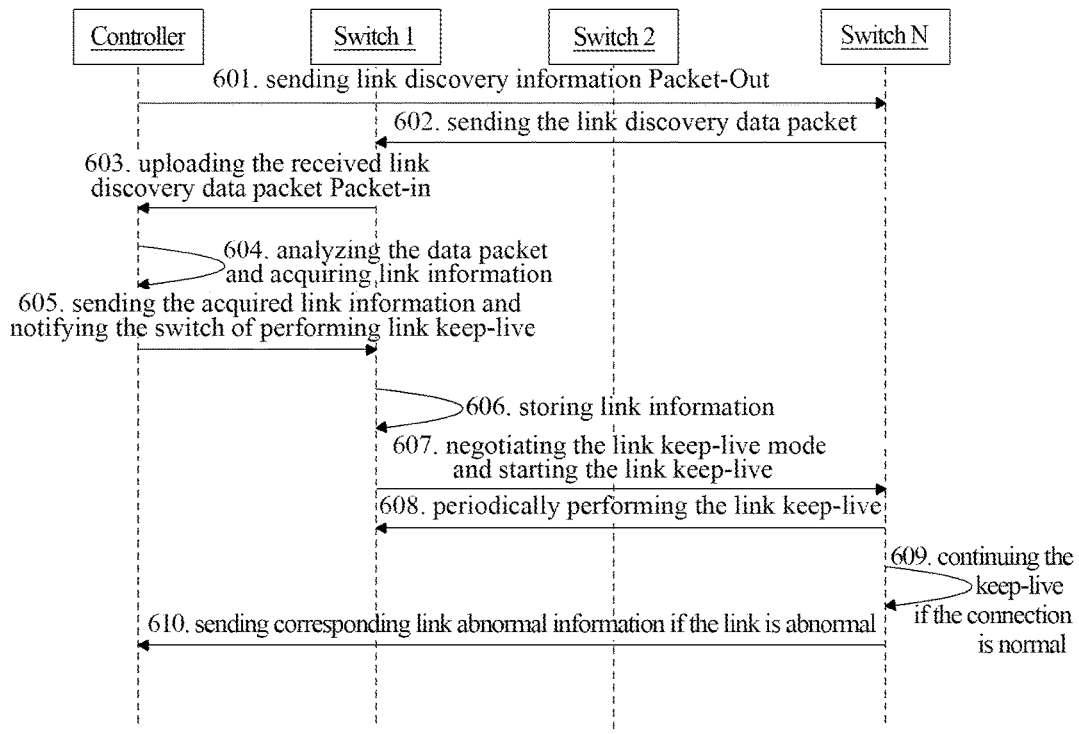
FIG. 6 is a flow diagram of a link keep-live method of an embodiment 5 of the invention.

In the link keep-live processing process which is performed by the controller and the switch in the embodiment, the controller only sends the acquired link information and notifies the switch to select the link keep-live mode by itself; as shown in FIG. 6, after being powered on, the switch establishes a connection with the controller, and the controller acquires the active port of the switch after the connection has been established, and the method in present embodiment comprises:

step 601: sending the link discovery message to the switch by the controller, wherein the link discovery message is carried in the Packet-Out data packet and the message contains the information of the port of the switch performing link discovery;

step 602: after the switch receives the link discovery message, sending the link discovery message from a port designated by the controller;

step 603: after the switch connected at the other end receives the message and matches a flow table, uploading the message to the controller (carried in the Packet-In);

step 604: receiving the Packet-In by the controller, wherein the message carries the identity and corresponding port number of the switch uploading the Packet-In; acquiring the identity and port number of the source switch sending the link discovery message from the message and acquiring link information of one link;

step 605: sending the acquired link information to the switch in the corresponding link by the controller and notifying the switch of performing link keep-live, wherein the keep-live mode is selected by the switch itself;

step 606: storing the link information sent from the controller by the switch so as to facilitate the link keep-live;

step 607: the switches negotiating to decide the link keep-live mode, wherein the link keep-live mode comprises a protocol used for link keep-live, related configuration information of the protocol and the like; and after the link keep-live mode is decided through negotiation, starting the link keep-live;

step 608: the switches performing link keep-live by themselves according to the negotiated link keep-live mode, wherein the controller does not need to interfere with the link keep-live process;

step 609: if the link is normal, continuously performing keep-live;

step 610: if the link is abnormal, sending corresponding link abnormal information to the controller and performing link discovery or subsequent work again by the controller.

Figure 7:
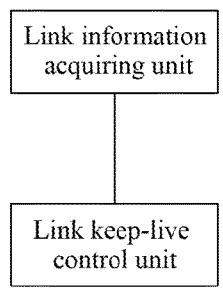
FIG. 7 is a structural diagram of a controller of embodiments of the invention.

As shown in FIG. 7, the embodiments also provide a controller, comprising a link information acquiring unit and a link keep-live control unit, wherein:

the link information acquiring unit is used for acquiring link information;

the link keep-live control unit is used for sending the link information to the source switch and/or the destination switch of the link corresponding to the link information after the link information acquiring unit acquires the link information; and, correspondingly sending keep-live mode information and a link keep-live starting instruction to the source switch and/or the destination switch, and triggering the source switch and/or the destination switch to perform the link keep-live between the source switch and the destination switch according to the link information and the keep-live mode information; or, sending the link information to the source switch and/or the destination switch of the link corresponding to the link information, triggering the source switch and/or the destination switch to determine the mode adopted for performing the link keep-live, and performing the link keep-live between the source switch and the destination switch according to the determined mode. The mode adopted for link keep-live comprises the information of a protocol used for link keep-live, and related configuration information of the protocol.

The keep-live mode information comprises the information of a protocol used for link keep-live, for indicating, to a switch, a protocol used to perform link keep-live.

The link keep-live control unit is also used for not sending the link discovery message to the source switch any more after the keep-live mode information is sent to the source switch and/or the destination switch, receiving the link abnormal information sent by the switch, and starting sending a link discovery message for the link to perform link discovery after the link abnormal information is received.

Figure 8:
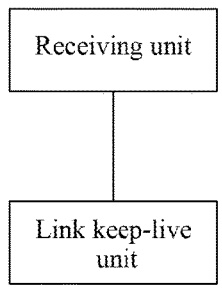
FIG. 8 is a structural diagram of a switch of the embodiments of the invention.

As shown in FIG. 8, the embodiments also provide a switch, comprising a receiving unit and a link keep-live unit, wherein:

the receiving unit is used for receiving the link information sent from the controller; or receiving the link information, the keep-live mode information and a link keep-live starting instruction sent from the controller;

the link keep-live unit is used for performing link keep-live with the opposite-end switches indicated by the link information according to the link information and the keep-live mode information after the receiving unit receives the link keep-live starting instruction sent from the controller; or determining a mode adopted for performing link keep-live and performing link keep-live with the opposite-end switches indicated by the link information according to the determined mode after the receiving unit receives the link information.

The link keep-live unit is also used for not receiving the link discovery message sent by the controller any more in a link keep-live process and under the condition that the link is normal; sending link abnormal information to the controller under the condition that the link is abnormal.

The keep-live mode information contains information of a protocol used for link keep-live, for indicating a protocol used to perform link keep-live.

The link keep-live unit is specifically used for: by adopting a protocol indicated by the keep-live mode information, performing link keep-live with the opposite-end switches indicated by the link information.

The link keep-live unit determines the mode adopted for link keep-live, comprising: the switch and the opposite-end switches indicated by the link information negotiate the protocol used for link keep-live and related configuration information.

Certainly, the present document may also have other multiple embodiments, those skilled familiar with the art should make various corresponding changes and transformations without departing from the spirit and essence of the present document, but those corresponding changes and transformations should belong to the protection scope of appended claims of the present document.

INDUSTRIAL APPLICABILITY

According to the embodiments of the invention under an openflow network model, the controller sends a link detection message to perform link detection, and the link keep-live information is sent to the switch after acquiring the link information, and a link keep-live method is negotiated with the switch, and the switch realizes link keep-live by itself according to the negotiation between the controller and the switch; the controller may also notify the switch of the acquired link information, and the mode for link keep-live may be negotiated and decided by the switches itself on the link; the controller is notified when the link state is changed, the massive link detection messages between the switch and the controller are avoided, the occupation of network bandwidth is saved and the consumption of computing resource of the controller is saved.

I claim:

1. A link keep-live method, comprising:
   acquiring link information by a controller,
   after the controller acquires link information, sending the link information to a source switch or a destination switch of a link corresponding to the link information, triggering the source switch or the destination switch to determine a keep-live mode, and performing link keep-live process between the source switch and the destination switch according to the determined keep-live mode;
   wherein the keep-live mode contains a protocol used for link keep-live process and related configuration information of the protocol.

2. The method according to claim 1, wherein, the link keep-live process further comprises:
   not sending a link discovery message to the source switch any more, receiving link abnormal information sent by a switch, and after the link abnormal information is received, starting to send a link discovery message for the link to perform link discovery.

3. A link keep-live method, comprising:
   receiving link information sent from a controller by a switch, after the link information is received, triggering the switch to determine a keep-live mode and performing link keep-live process with opposite-end switches indicated by the link information according to the determined keep-live mode;
   wherein the keep-live mode contains a protocol used for link keep-live process and related configuration information of the protocol.

4. The method according to claim 3, wherein the method further comprises:
   in the link keep-live process of the switch, under a condition that a link is normal, not receiving a link discovery message sent by the controller any more; and
   under a condition that a link is abnormal, sending link abnormal information to the controller.

5. The method according to claim 3, wherein,
   performing link keep-live process with opposite-end switches indicated by the link information according to the determined keep-live mode, comprises: the switch adopts the protocol indicated by the keep-live mode to perform link keep-live process with the opposite-end switches based on the link information.

6. The method according to claim 3, wherein determining the keep-live mode, comprises:
   the switch negotiating the protocol used for link keep-live process and the related configuration information of the protocol with the opposite-end switches indicated by the link information.

7. A controller, comprising: a link information acquiring circuitry and a link keep-live control circuitry, wherein:
   the link information acquiring circuitry is set to: receive link information;
   the link keep-live control circuitry is set to:
   after the link information acquiring unit acquires the link information, send the link information to a source switch or a destination switch of a link corresponding to the link information, trigger the source switch or the destination switch to determine a keep-live mode, and perform link keep-live process between the source switch and the destination switch according to the determined keep-live mode;
   wherein the keep-live mode contains a protocol used for link keep-live process and related configuration information of the protocol.

8. The controller according to claim 7, wherein
   the link keep-live control circuitry is also set to: not send a link discovery message to the source switch any more, receive link abnormal information sent by a switch, and start sending a link discovery message for the link to perform link discovery after the link abnormal information is received.

9. A switch, comprising: a receiving circuitry and a link keep-live circuitry, wherein:
   the receiving circuitry is set to: receive link information sent from a controller;
   the link keep-live circuitry is set to: after the receiving unit receives the link information, trigger the switch to determine a keep-live mode and perform link keep-live process with opposite-end switches based on the received link information according to the determined keep-live mode;
   wherein the keep-live mode contains a protocol used for link keep-live process and related configuration information of the protocol.

10. The switch according to claim 9, wherein
    the link keep-live circuitry is also set to: not receive a link discovery message sent by the controller any more in the link keep-live process and under a condition that a link is normal; and send link abnormal information to the controller under a condition that a link is abnormal.

11. The switch according to claim 9, wherein
    the link keep-live circuitry is set to adopt the protocol indicated by the keep-live mode to perform link keep-live process with the opposite-end switches based on the link information.

* * * * *